Aug. 12, 1969
J. P. SWANSON
3,460,656
MISSED ENGAGEMENT CONTROL
Filed Jan. 24, 1968
3 Sheets-Sheet 1
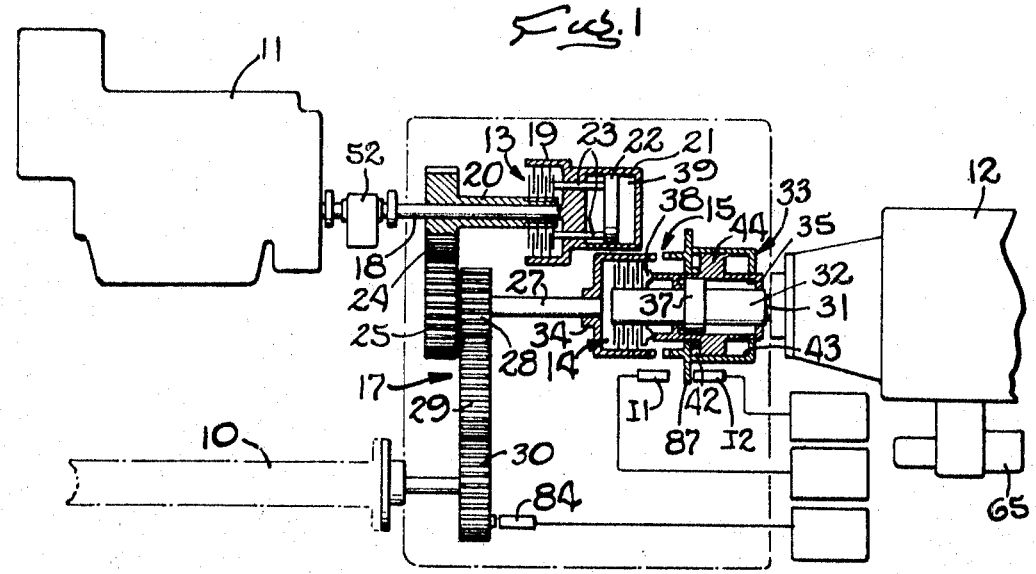
INVENTOR
James P. Swanson
by Wolfe, Hubbard, Voit & Osann
ATTORNEYS

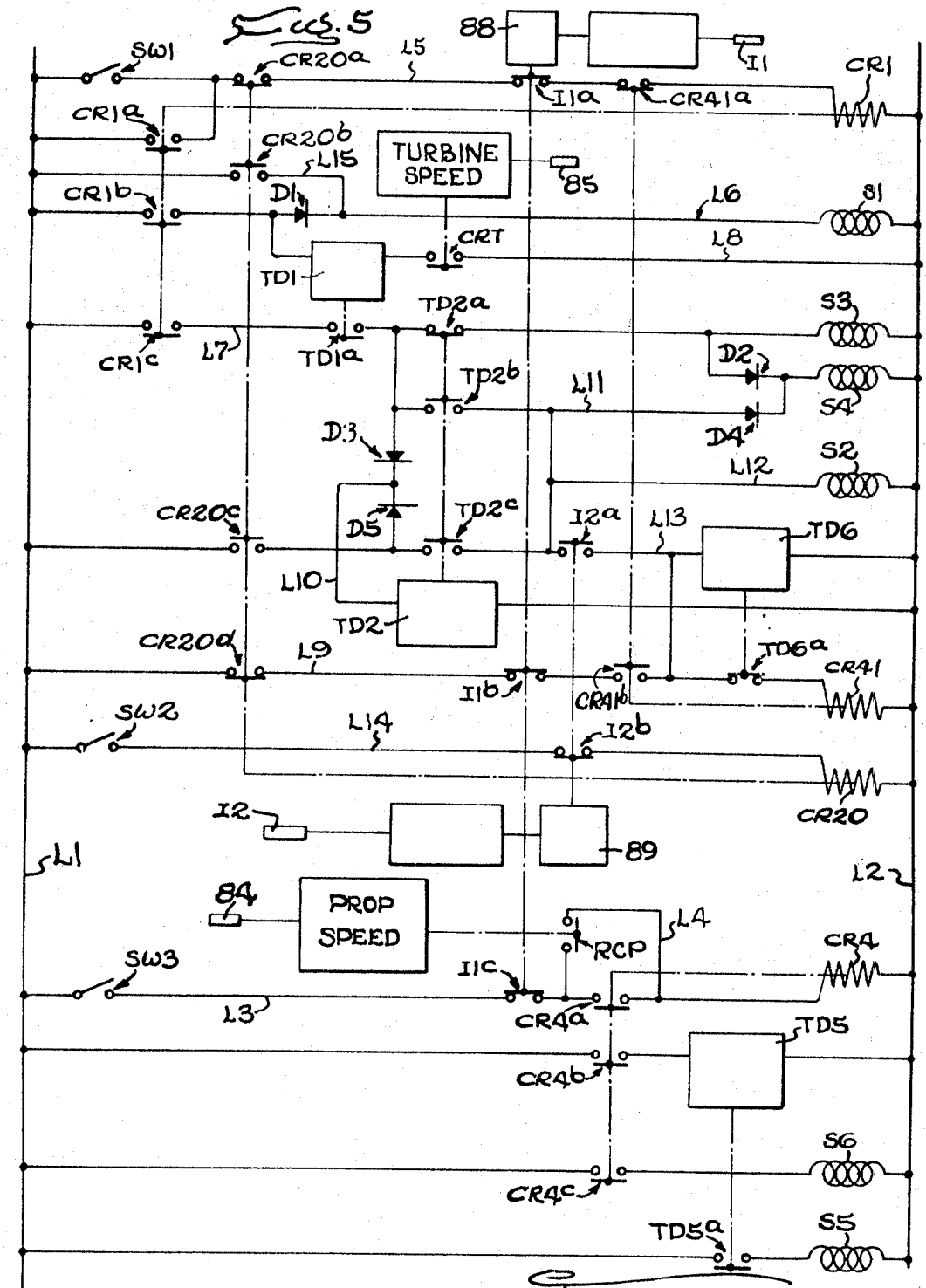

Aug. 12, 1969  J. P. SWANSON  3,460,656
MISSED ENGAGEMENT CONTROL
Filed Jan. 24, 1968  3 Sheets-Sheet 3
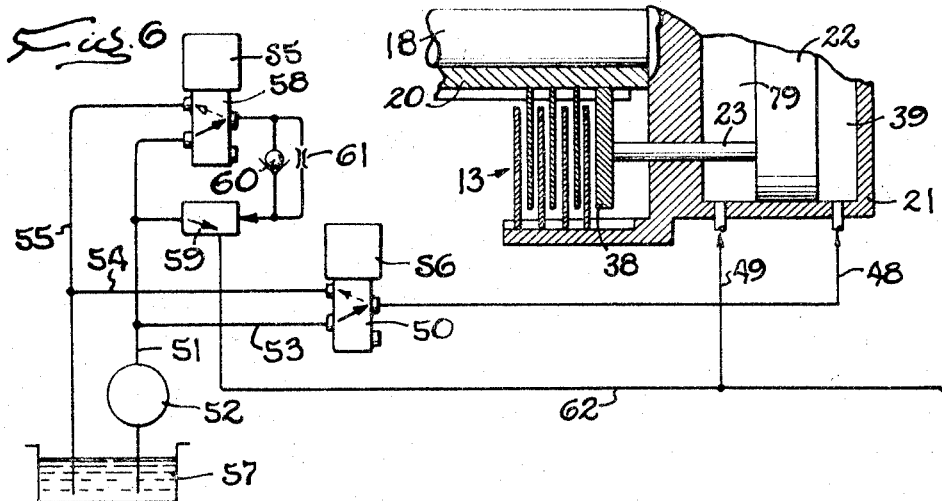
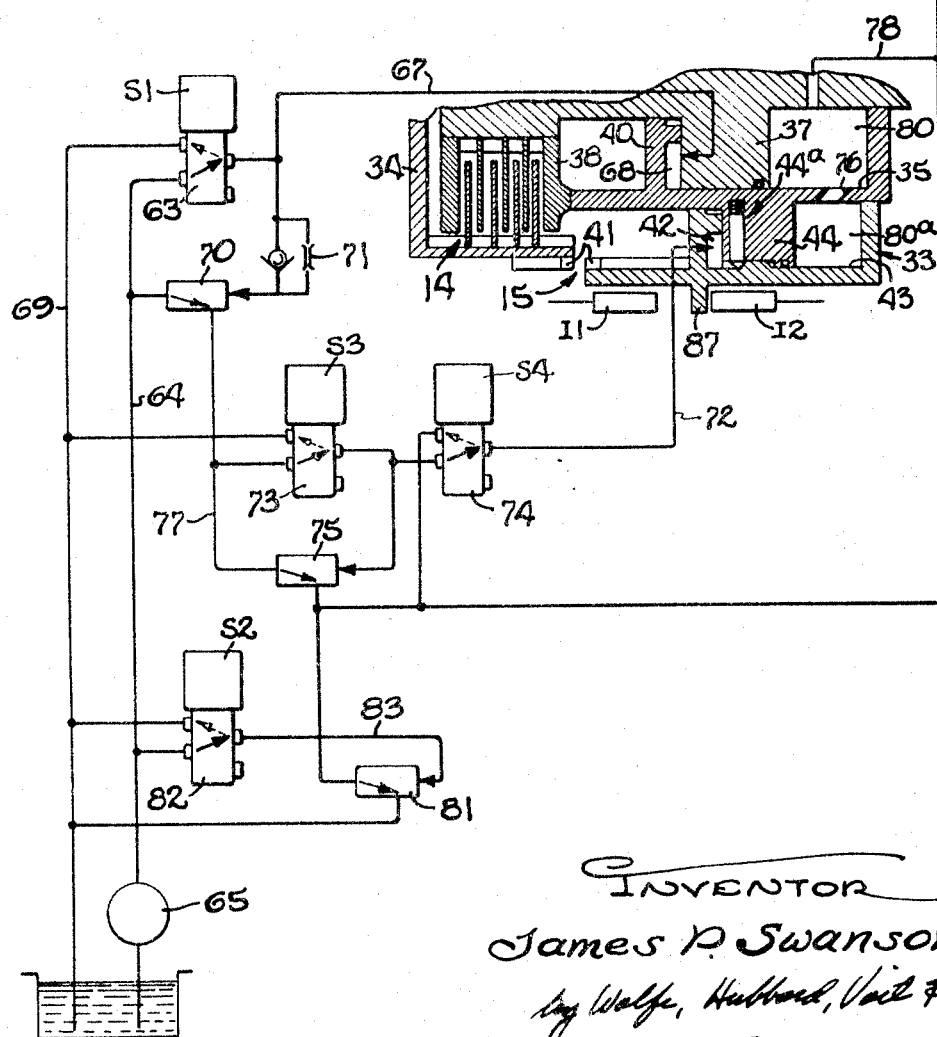
INVENTOR
James P. Swanson
by Wolfe, Hubbard, Voit & Osann
ATTORNEY

United States Patent Office 3,460,656
Patented Aug. 12, 1969

3,460,656
MISSED ENGAGEMENT CONTROL
James P. Swanson, Rockford, Ill., assignor to Twin Disc, Incorporated, Racine, Wis., a corporation of Wisconsin
Filed Jan. 24, 1968, Ser. No. 700,084
Int. Cl. F16d 47/02, 23/00, 47/00
U.S. Cl. 192—48.5          14 Claims

ABSTRACT OF THE DISCLOSURE

A control for a propulsion system including a diesel engine and a gas turbine engine with a friction clutch for coupling the diesel to an output shaft and a synchronizing twin clutch for coupling the turbine to the shaft, first with a friction clutch for reducing the turbine speed to that of an intermediate output shaft while the latter is driven by the diesel and then with a positive-locking toothed clutch engageable when the speeds are synchronized. The control includes means for actuating fluid operators for the three clutches, proximity sensors signaling full engagement and disengagement of the positive clutch, and speed sensors preventing engagement of the positive clutch before synchronization and also preventing return to diesel drive while the speed is above the proper diesel range. In addition, the control produces an automatic cycle during attempted engagement of the positive clutch including signaling of failure to engage in the proper manner due to interference between the clutch teeth, full disengagement of the positive clutch, controlled slipping of the synchronizing clutch to change the angular relation of the teeth, and initiation of another attempt to engage the positive clutch, repeating this cycle until the positive clutch is fully engaged and the diesel and synchronizing clutches can be disengaged.

BACKGROUND OF THE INVENTION

This invention relates to the control of clutches for connecting a drive member to an output member while the latter is transmitting torque from another drive member and, more particularly, to the alternate coupling of two engines of a propulsion system to a common output shaft for operation of the output shaft at different speeds. A specific example is a combined diesel and gas turbine marine propulsion system in which the propeller shaft is to be driven by a diesel engine in a low speed range and by a gas turbine engine for high speed operation, thereby providing a wide range of selection of power with optimum performance and efficiency throughout the range.

A known clutching arrangement for this application is disclosed in Patent No. 3,161,270 and involves the use of a positive-locking gear coupling or toothed clutch for coupling the turbine to the propeller shaft while the latter is being driven by the diesel. The toothed clutch has two annular sets of angularly spaced teeth movable axially into interfitting engagement when the teeth of the two sets are angularly offset from each other, and is engaged while the turbine and the output shaft are held in synchronization by an auxiliary friction clutch capable of coupling the two together while the turbine is idling at a higher speed than that of the shaft and slipping while reducing the turbine speed into synchronization with the diesel speed. Thus, the toothed elements of the positive-locking clutch are moved together while turning at the same speed so as to be stationary relative to each other.

SUMMARY OF THE INVENTION

Because of the nature of toothed clutches, it is possible to aline the elements in relative angular positions in which they will block each other against moving into engagement. The general object of the present invention is to sense such a missed engagement and promptly initiate corrective action to avoid interference with effective operation of the driven apparatus and possible damage to the propulsion system. A more detailed object is to sense failure of the positive clutch to engage in the normal manner, and to automatically initiate a new engagement cycle including separation of the clutch elements, controlled slipping of the synchronizing clutch to change the angular relation of the elements, and reactuation of the positive clutch in the changed condition. Another object is to control the respective clutches to effect the power transition from one engine to the other automatically and with no possibility of loss of power to the driven shaft, even if the positive clutch should fail to engage one or more times during the transition.

Other objects and advantages of the invention will become apparent from the following detailed description, taken in conjunction with the accompanying drawings.

BRIEF DESCRIPTION OF THE DRAWINGS

FIGURE 1 is a fragmentary schematic view, partly in cross-section, of a combined diesel and turbine drive arrangement including the basic components of a control embodying the novel features of the present invention.

FIGS. 2–4 are enlarged fragmentary views schematically illustrating three different relative positions of the teeth of a positive-locking clutch, namely, a disengaged position, an engaged position and a missed engagement.

FIG. 5 is a simplified schematic wiring diagram of the control, all components being shown in deenergized condition.

FIG. 6 is a fragmentary schematic view, partly in cross-section, of the hydraulic circuitry and the clutches.

DETAILED DESCRIPTION

As shown in the drawings for purposes of illustration, the invention is embodied in a control for a propulsion system comprising generally an output shaft 10 adapted to be driven alternately by two prime movers 11 and 12, herein a diesel engine and a gas turbine engine, through clutches 13, 14 and 15 and combining gearing 17 providing a wide range of operating characteristics by transferring the drive of the output shaft selectively from one engine to the other. The clutch 13 couples the diesel to the output shaft while the clutches 14 and 15 are used to couple the turbine to the shaft, one clutch 14 being of the slip-friction type capable of synchronizing the turbine and the shaft prior to engagement of the clutch 15 which is a positive-locking, toothed clutch.

One application for which such a system is suited is in high-performance marine craft such as attack and patrol boats in which the diesel 11 is used for low-speed cruising and maneuvering and the gas turbine 12 is used for high-speed operation. While the invention is described in connection with a combined diesel and turbine marine propulsion system, it will be apparent that it may be used in other environments and is not to be limited to such systems.

As shown in FIG. 1, the drive shaft 18 of the diesel engine 11 carries a driving member 19 in the form of a hollow head fitted internally with a set of clutch disks which alternate with another set of disks fast on a second sleeve 20 telescoped over the drive shaft, the two sets of disks forming the clutch 13. Mounted on the head 19 is a clutch operator comprising a cylinder 21 guiding a piston 22 connected by rods 23 to the disks on the sleeve 20 to shift the latter and the disks axially relative to the diesel shaft into clutching engagement with the disks on the head to couple the diesel shaft 18 drivingly to the sleeve. The latter carries a gear 24 meshing with a gear 25 on an intermediate output shaft 27 coupled by gears 28, 29 and 30 to the output shaft 10 for driving the propeller (not shown). Thus, the diesel is drivingly connected to the propeller shaft when the clutch 13 is engaged, and is uncoupled when this clutch is disengaged.

When the propeller shaft 10 is to be driven by the gas turbine engine 12, the intermediate shaft 27 is coupled to the drive shaft 31 of the turbine through a twin-clutch device of the type disclosed in Patent No. 3,-161,270. This device comprises a driving member 32 fast on the turbine shaft and carrying a driving hub 33, a driven member 34 also in the form of a hub fast on the intermediate shaft, and the synchronizing friction and positive-locking clutches 14 and 15, respectively, arranged to couple the two shafts together. The friction clutch is formed by two sets of alternating clutch plates fastened to the driving member 32 and the driven hub 34 for engagement by an operator comprising a movable cylinder 35 telescoped over a fixed piston 37 and abutting against a movable presusre plate 38 of the clutch. Thus, when pressure fluid is delivered to the chamber 68 (see FIG. 6) defined between the piston and the left end wall 40 of the cylinder, the latter moves to the left to clamp the clutch plates together in frictional gripping engagement.

The positive-locking clutch 15 herein is represented by two annular sets of angularly spaced teeth 41 formed in the adjacent edges of the two hubs 33 and 34, these teeth being spaced axially apart when the clutches 14 and 15 are disengaged and also when the friction clutch 14 is engaged. To engage the positive clutch 15, pressure fluid is delivered to the actuating chamber 42 of an operator comprising a second cylinder 43 formed in the driving hub 33 and telescoped over a piston 44 fixed to the cylinder 35, thereby to shift the outer cylinder 43 to the left and move the teeth 41 into interlocking relation for a positive drive connection between the two hubs. A spring-loaded detent 44a (FIG. 6) holds the two cylinders 35 and 43 releasably in each selected relationship and thus eliminates the need for maintaining high-pressure fluid in the cylinder 43. Reference is made to the aforesaid patent for additional details of construction not contained herein.

With the foregoing general arrangement, the diesel clutch operator is actuated to engage the diesel clutch 13 when the shaft 10 is to be driven by the diesel 11 in the lower speed operating range, for example, with speeds of shaft 27 up to 1800 r.p.m. and speeds of shaft 10 up to 1200 r.p.m. with the well known operating advantages of diesels in this range. When drive in a higher speed ranges is required, the synchronizing clutch 14 is engaged while the gas turbine 12 is idling, a typical unloaded idling speed of the turbine shaft 31 being 3000 r.p.m. Engagement of the friction clutch 14 with the intermediate shaft 27 and the turbine shaft 31 turining at different speeds (e.g., the former at 1800 r.p.m. and the latter at 3000 r.p.m.) applies the load of the propeller shaft 10 and the diesel to the turbine through the slip-friction connection and thus drops the turbine shaft 31 speed sharply (e.g., to 1800 r.p.m.) until it is synchronized with the speed of the intermediate shaft 27, at which time the friction clutch locks up and prevents further relative motion between the two hubs 33 and 34 of the positive clutch 15. Then the turbine clutch operator is actuted to shift the movable hub 33 toward the hub 34 and bring the two sets of teeth 41 into interlocking relation. When this has been accomplished, both of the other clutches may be disengaged for driving of the propeller shaft by the turbine alone. The turbine throttle may then be opened to increase the speed of drive from the turbine to the shaft 27 and thus to the shaft 10.

It wil be evident, however, that there is no control over the relative positions of the two sets of teeth 41 when the shafts 27 and 31 are synchronized. In some instances, the teeth of each hub will be alined with the recesses between the teeth of the other hub, and in other instances the teeth of the two sets will be in opposed relation so as to block the movable hub against moving into the engaged position. As shown in FIGS. 2–4, the free ends of both sets of teeth are beveled at 45 to minimize the likelihood of direct interfering contact, FIG. 2 illustrating a relative position from which the teeth may move into the fully engaged condition (FIG. 3), and FIG. 4 illustrating the blocking condition of the teeth. The ends 47 of the teeth are flattened or rounded for the ruggedness required to avoid breaking and chipping in service use.

The transition from the generally alined condition in FIG. 2 to the fully engaged condition in FIG. 3 is accomplished automatically by the twin clutch device in which the force of the actuating pressure in the chamber 42 builds up and acts against the piston 44 to reduce the clamping pressure of plates of the synchronizing clutch 14 while the beveled teeth are pressed against each other and tending to produce relative rotation of the two hubs into a fully alined position. Thus, the synchronizing clutch slips to permit the hubs to aline themselves and move into the fully engaged position whenever the opposed bevels are pressed together as in FIG. 2. Dead-on missed engagements, as shown in FIG. 4, will occur with a frequency related to the proportion of free space to blocked space generally in the planes of the ends 47 of the teeth, and will prevent normal transition from diesel drive to turbine drive.

In accordance with the present invention, such missed engagements are detected when they occur and corrective action is initiated automatically to avoid interference with effective operation of the propulsion system, including separation of the clutch hubs 33 and 34, controlled slipping of the synchronizing clutch 14 to change the angular relation of the hubs, and reactuation of the positive clutch operator to engage the positive clutch in the changed condition. This cycle is repeated automatically as many times as necessary to accomplish the engagement, but usualy only once, to effect the power transition from one engine to the other without loss of power at the propeller shaft 10.

In this instance, a missed engagement is detected by sensing means including a proximity sensor I1 (FIGS. 1 and 5) responsive to the position of the movable clutch hub 33 and operable to produce a signal when this hub is in its fully engaged position, and a timer TD2 activated when clutch engagement is initiated and operable to produce another signal if the clutch has not been engaged after a preselected time delay of sufficient duration for the clutch to engage in a normal manner. The timer signal is utilized to initiate the corrective reengagement cycle, and the engagement signal, when it occurs within the selected time interval, is used to disable the timer and prepare the control for operation with the gas turbine alone. A second proximity sensor I2 is responsive to the return of the hub 33 to its fully retracted or disengaged position and produces another signal that is used during the reengagement cycle first to produce the controlled slippage of the synchronizing clutch 14 and then to actuate the positive clutch operator in a direction to engage the clutch in the new angular relation of the hubs. Other suitable control components are provided for insuring that the speeds of the shafts 10 and 27 are within the proper ranges for the transitions from one engine to the other, and for producing the proper sequences of operations during each transition, as will be apparent from the following detailed descriptions of the hydraulic and electrical control circuitry and summary of operation.

HYDRAULIC CONTROL CIRCUITRY

First, with respect to the hydraulic circuitry, it will be seen in FIG. 6 that the cylinder 21 of the diesel clutch 13 receives pressure fluid on opposite sides of the piston 22 through two lines 48 and 49 opening into the cylinder through ports spaced on opposite sides of the piston. Clutch-engaging pressure is applied to the chamber 39 in the right end portion of the cylinder through the line 48 and a control valve 50 having a solenoid actuator S6. When the solenoid is energized, this valve admits pressure fluid from the output line 51 of a pump 52 through a branch line 53 and the valve to the line 48 (as indicated by the full arrow) to shift the piston 22 to the left and engage the clutch 13. When the solenoid is deenergized, the chamber 39 is vented through the valve (as indicated by the broken arrow) and a branch line 54 to a return line 55 leading to the sump 57 of the pump.

Another valve 58 actuated by a solenoid S5 controls the pressure of the fluid passing through the valve 50 by controlling the setting of a pressure-relief valve 59. When the solenoid S5 is deenergized, the parallel combination of a check valve 60 and a restriction 61 is vented through the valve 58 to the return line 55 so that the relief valve operates to dump fluid to a line 62 and maintain the supply pressure to the valve 50 at a relatively low level such as 60 p.s.i. This low pressure fluid is used to begin applying the clutch. When the solenoid S5 if energized, however, fluid is admitted through the valve 58 (as indicated by the full arrow) and the restriction 61 to load the relief valve 59 and increase its pressure setting to a relatively high level such as 250 p.s.i., thereby increasing the actuating pressure in the clutch operator to this high level after a short delay.

The hydraulic circuitry for the synchronizing twin clutch includes a control valve 63 (FIG. 6) actuated by a solenoid S1 and operable when this solenoid is energized to admit pressure fluid from the output line 64 of a pump 65 to a line 67 leading to the chamber 68 formed on the left side of the piston 37 of the operator of the synchronizing clutch, thereby to shift the cylinder to the left and cause the pressure plate 38 to clamp the clutch plates together. When the solenoid S1 is deenergized, the line 67 is vented through the valve to a return line 69. A relief valve 70 preferably sets the pressure in the output line 67 at a low value such as 105 p.s.i. when the valve S1 first is opened and then quickly increases this pressure to a higher value such as 325 p.s.i. by loading the relief valve through a restriction 71 for high-pressure engagement of the clutch 14.

To shift the movable hub 33 of the positive clutch 15 to the left toward the hub 34, pressure fluid is delivered to the chamber 42 formed in the cylinder 43 on the left side of the piston 44 through a line 72 and through series-connected control valves 73 and 74 actuated respectively by solenoids S3 and S4, the pressure of this fluid being controlled by a relief valve 75 setting the pressure in an input line 77 at a low level such as 80 p.s.i. when the solenoid S3 is deenergized and the valve 73 is closed, and at a higher level such as 275 p.s.i. when the valve is open. Thus, when both solenoids S3 and S4 are energized, the associated valves 73 and 74 deliver high pressure fluid to the line 72 and the chamber 42 to initiate positive clutch engagement.

Disengagement of the diesel clutch 13 and the synchronizing clutch 14 is accomplished whenever the respective actuating valves 50 and 63 are in the solenoid-deenergized condition (to vent the chambers 39 and 68) by relatively low pressure maintained in the line 62, and thus in branch lines 49 and 78 leading to the "retract" chambers 79 and 80 of the two operators. This pressure is maintained by a pressure relief valve 81 set for a level such as 40 p.s.i. when the solenoid S2 of a valve 82 is deenergized, this pressure being sufficient to disengage the diesel clutch. When the solenoid S2 is energized, the valve 82 is opened, as indicated by the full arrow, to load the relief valve through a line 83 and increase its setting to a higher pressure such as 100 p.s.i., correspondingly increasing the pressure in line 62 and in the branch lines leading to the two "retract" chambers. It will be seen that the chamber 80 communicates with the "retract" chamber 80ª of the positive clutch operator through a connecting port 76 so that pressure applied to the chamber 80 also is applied to the chamber 80ª. This pressure is sufficient to retract the movable hub 33 against the retaining action of the detent 44ª, but is insufficient to disengage either of the other clutches 13, 14 if high-pressure actuating fluid has been applied thereto through the lines 48 or 67.

Preferably, the pump 52 is driven by the diesel shaft 18 as shown in FIG. 1, and the pump 65 is driven by the turbine 12. While both pumps are shown herein as supplying fluid to line 62, it will be evident that another pump (not shown) such as one operated from the propeller shaft 10 could be included for this purpose.

ELECTRICAL CONTROL CIRCUITRY AND SUMMARY OF OPERATION

In the schematic wiring diagram in FIG. 5, the various components are shown in deenergized condition ready for operation in response to commands from the operator of the propulsion system, for example, the person stationed at the bridge or pilot house control station with the usual instrumentation. Herein, the command controls are shown in simplified form as three switches—switch SW1 for initiating the transition from diesel to turbine operation, switch SW2 for initiating turbine disengagement, and switch SW3 for engaging the diesel clutch 13.

Let is be assumed for purposes of illustration that both the turbine 12 and the diesel 11 are running at idle speeds, thereby operating the diesel and turbine pumps 52 and 65 to provide pressure fluid in the pump output lines 51 and 64 (FIG. 6) for operation of the clutches 13, 14 and 15 upon command. To engage the diesel clutch 13 for operation of the ship under diesel power, the operator closes switch SW3 to complete a circuit across D.C. power lines L1 and L2 through a line L3 including presently closed switch I1–c and a line L4 including a switch RCP which is closed by a speed sensor 84 whenever the speed of the output shaft 10 is below that which corresponds to the speed of intermediate shaft 27 having a preselected value such as 2100 r.p.m. Thus, during starting, the switch RCP is closed to complete a circuit to a relay CR4 around switch CR4–a, energizing the relay to close its normally open switches CR4–a, –b and –c to engage the diesel clutch.

Switch CR4–a closes in line L3 for a sealing circuit around switch RCP while switch CR4–b closes in the circuit of a timer TD5 and switch CR4–c closes in the circuit of solenoid S6 to energize the latter immediately. This opens value 50 (FIG. 6) to admit low pressure fluid into the line 48 and begin filling the operator chamber 39. The delayed closure of the timer-operated switch TD5 in the circuit of solenoid S5, for example, one-half second after the energization of solenoid S6, increases the pressure input to the high setting of the relief valve 59 to complete the engagement of the diesel clutch 13 with the high-pressure fluid. Thus, the system is ready for operation under diesel power at any speed within the range of the diesel 11.

If the pilot now wishes to change from diesel to turbine operation, he closes switch SW1 in a line L5 to complete an energizing circuit across the power lines L1 and L2 for a relay CR1. This circuit is through closed switches CR20–a, I1–a and CR41–a. When energized, relay CR1 closes its switch CR1–a to seal around switch SW1, its switch CR1–b in a line L6 leading to solenoid S1, and its switch CR1–c in a line L7. Through switch CR1–b and a diode D1, solenoid S1 is energized to open valve 63 and deliver pressure fluid through line 67 to the chamber 68 of the synchronizing clutch operator, initially at the low-pressure setting of relief valve 70 and then at the high-pressure setting when fluid leaking through the restriction 71 is effective to load the relief valve. Thus, the synchronizing clutch 14 is engaged to bring the idling turbine 12 into synchronization with the intermediate shaft 27. The positive clutch 15 remains deactivated because a switch TD1–a remains open in line L7 and the circuit to solenoids S3 and S4.

Actual synchronizing of the turbine shaft 31 and the intermediate output shaft 27 may be sensed, but in this case a drop in the turbine speed shaft speed, due to the loading of the turbine by engagement of clutch 14, to a preselected level, herein 2500 r.p.m., is sensed by a detector 85 which produces a signal that is used to initiate engagement of the positive clutch 15 after an additional timed delay of a few seconds sufficient to insure that the shaft and the turbine are synchronized. Specifically, the detector closes its switch CRT in a line L8 for energizing a timer TD1 when the turbine shaft speed has dropped to 2500 r.p.m., and the timer closes its switch TD1–a in line L7 after a delay of three seconds to energize both solenoids S3 and S4 to open valves 73 and 74 and admit fluid from pump line 64 through line 77 and the valves to line 72 and the chamber 42, thus actuating the operator of the positive clutch in a direction to engage the latter. Accordingly, the movable hub 33 is shifted to the left (FIG. 6) toward the hub 34 while the two hubs are angularly stationary relative to each other, and the teeth 41 of the hubs will become interlocked if the angular relation is such that there is no direct interference between the two sets of teeth.

The proximity sensor I1 is located, as shown in FIGS. 1 and 6, adjacent the engaged position of a flange 87 on the movable hub 33 to operate three switches I1–a, –b and –c through a .5-second delay device 88 that is actuated when the hub reaches this position, thus signaling successful completion of the engagement cycle. Thus, .5 of a second after engagement is sensed, switch I1–a opens in the circuit of relay CR1 to deenergize the latter and drop out its three switches, deenergizing both the synchronizing clutch solenoid S1 and the positive clutch solenoids S3 and S4 with the opening of switches CR1–b and CR1–c. At the same time, switch I1–c opens in line L3 to deenergize relay CR4 and thus disengage the diesel clutch 13 by deenergizing solenoids S5 and S6. This leaves the propulsion system in condition for operation by the turbine 12 alone, through the positive clutch 15.

If the teeth 41 on the hubs 33, 34 were synchronized in an angular relation such that the movable hub 33 is blocked against moving into the engaged position, the missed engagement is sensed and signaled by a timer TD2 that is energized by the closure of switch TD1–a, simultaneously with the actuation of the positive clutch 15. This timer is set for a preselected interval longer than the time required for normal engagement of the clutch, for example, nine seconds, and is energized through a circuit including switches CR1–c and TD1–a, a diode D3 and a line L10. Accordingly, if proper engagement occurs within the nine second interval and switch I1–a opens to deenergize relay CR1, switch CR1–c opens to disable the timer before it times out and actuates its switches. If, on the other hand, the timer times out before engagement is sensed by sensor I1, switches TD2–b and –c close while switch TD2–a opens, thereby initiating a reengagement cycle.

The opening of switch TD2–a deenergizes solenoid S3 to close valve 73 while simultaneous closure of switch TD2–b maintains an energizing circuit for solenoid S4 through a line L11 and a diode D4, and also establishes an energizing circuit for solenoid S2 through switches CR1–c, TD1–a and TD2–b and a line L12. Thus, solenoid S2 opens valve 82 to increase the setting of relief valve 81 to its high level, increasing the pressure in lines 62 and 78 and the "retract" chamber 80ª of the operator of the positive clutch 15 while the chamber 42 is vented through valves 73 and 74 to the return line 69. This shifts the movable hub 33 to the right (FIG. 6) and returns it to the fully disengaged position. Since solenoids S1, S5 and S6 remain energized, the engagement of the diesel and synchronizing clutches 13 and 14 is maintained.

The proximity sensor I2 is positioned adjacent the disengaged position of the flange 87 on the movable hub 33 to operate two switches I2–a and I2–b through another .5-second delay device 89 after the hub returns to the disengaged position. When switch I2–a closes in a line L13, it completes a circuit for a timer TD6 and a relay CR41, the latter being energized through switches CR1–c, TD1– a, TD2–b, and TD6–a and thereby closing switch CR41–b to seal in the relay and the timer through line L9. Opening of switch CR41–a in the circuit of relay CR1 deenergizes this relay, and all of the relays of the system controlled by relay CR1 drop out, solenoid S1 thus being deenergized to close valve 63 (FIG. 6) and vent the chamber 68 of the synchronizing clutch 14 to return line 69 so that the clutch is permitted to slip momentarily. Timer TD6 opens its switch TD6–a after a short delay such as .5 of a second to deenergize relay CR41 and reclose switch CR41–a to a permit a reinitiation of the engagement cycle with the hubs 33 and 34 in a changed angular relation after the controlled slippage of the synchronizing clutch.

Assuming the switch SW1 still is closed, reclosure of switch CR41–a after the momentary delay produced by timer TD6 initiates the whole sequence previously described for engaging the positive clutch 15, including engagement of the synchronizing clutch 14, initiation of the timed interval for engagement of the positive clutch as sensed by proximity sensor I1, and signaling of failure to engage during the timed interval by timer TD2. If the synchronizing clutch happens to slip by an amount that brings the two sets of teeth 41 again into opposed, blocking relation, another missed engagement can occur, followed automatically by corrective action and another engagement cycle. The odds are, however, that only one corrective cycle will be necessary to adjust the position of the hubs 33 and 34 and accomplish positive clutch engagement.

When successful engagement is complete, sensor I1 opens its switches to condition the control system for operation of the propulsion system with the turbine 12 alone. Switch I1–a deenergizes relay CR1 which deenergizes the synchronizing clutch solenoid S1 and the related relays while switch I1–b opens in line L9 and switch I1–c opens in line L3, deenergizing relay CR4 to deenergize the diesel clutch solenoids S5 and S6 and thereby close the valves 58 and 50. Thus, the diesel clutch chamber 39 is vented to permit disengagement of this clutch as well, by low pressure fluid in chamber 79. Although the positive clutch actuating chamber 42 now is connected through valve 74 to low-pressure line 62, the retract chamber 80ª also is connected to line 62 and the retaining force of the detent 44ª is sufficient to hold the hub 33 in the engaged position.

To return to diesel operation from turbine operation, the pilot merely closes a switch SW2 in a line L14 to complete an energizing circuit for a relay CR20 through switch I2–b which, of course, is closed when the positive clutch 15 is engaged. This relay immediately operates its four switches to initiate disengagement of the positive clutch and engagement of the diesel clutch 13. First, switch CR20–a opens in the circuit of relay CR1, and switch CR20–b closes in a line L15 around switch CR1–b to energize solenoid S1 and engage the synchronizing clutch 14. This, in effect, unloads the teeth 41 of the positive clutch 15 for disengagement. At the same time, switch CR20–c is closed in line L13 to energize the nine-second timer TS2 through diode D5 and line L10, and switch CR20–d opens in line L9.

Upon closure of switch TD2–c at the expiration of the nine-second interval, solenoids S2 and S4 are energized through switch CR20–c and lines L12 and L11 to open valves 82 and 74. Fluid delivered to the relief valve 81 through line 83 increases the pressure setting of this valve, and thus increases the pressure in line 62 which communicates with the "retract" chamber 80ª through line 78 and chamber 80. At the same time, the actuating chamber 42 is vented through energized valve 74 and deenergized valve 73 to return line 69. Accordingly, the hub 33 is retracted to the disengaged position to disengage the positive clutch 15. When this is complete, sensor I2 opens its switch I2–b after the .5-second delay to deenergize relay CR20 and open switch CR20–b in the circuit of solenoid S1 of the synchronizing clutch 14 while also opening switch CR20–c in the circuit of solenoids S2 and S4 of the positive clutch 15, thereby leaving both of these clutches disengaged.

Diesel-engagement switch SW3 may be closed along with turbine-disengagement switch SW2 to prepare a circuit for energizing solenoids S5 and S6 in response to completion of turbine disengagement. As soon as this occurs, as sensed by sensor I1 and signalled by closure of switch I1–c in line L3, relay CR4 is energized through line L4 if the speed of the output shaft 10 is below the selected speed of 2100 r.p.m. so that switch RCP is closed. This prevents engagement of the diesel clutch 13 while the shaft 10 is turning at a speed that could produce dangerous over-speeding of the diesel engine 11.

If the speed of shaft 27 is above 2100 r.p.m. when switch I2–c closes, switch RCP remains open until the speed has dropped to the safe level, then closes to complete the circuit to relay CR4. This closes sealing switch CR4–a (so that later momentary over-speeds above the governed diesel speed will not disengage the diesel clutch 13) and closes switches CR4–b and CR4–c to engage the diesel clutch first with fluid at the low-pressure setting of relief valve 59 and then with the higher-pressure fluid, as previously described. The turbine 12 now may be shut down or left running at idle speed ready for reengagement.

From the foregoing, it will be evident that the present invention provides a novel control with which missed engagements are sensed automatically and a corrective cycle is antomatically produced to change the relative angular positions of the two clutch elements and actuate the clutch for another attempted engagement, all while maintaining the driving connection to the other engine until successful engagement of the positive clutch is completed.

I claim as my invention:

1. In combination with a diesel engine, a gas turbine engine, an output shaft drivable by either of said engines in different speed ranges, first and second clutches for coupling said engines respectively to said output shaft, said second clutch being a positive-locking toothed clutch having a first clutch element rotatable with said output shaft and a second clutch element rotatable by said gas turbine engine, one of said elements being movable between engaged and disengaged positions and capable of being blocked in one angular relation of said elements, and a synchronizing friction clutch for coupling said gas turbine engine to said output shaft independently of said second clutch when the output shaft is turning at a speed slower than the speed of said gas turbine engine, thereby to synchronize said speeds, the improvement comprising a shift control for changing from one engine to the other, said control including, selectively operable means for actuating a first operator to activate and deactivate said diesel engine when said second clutch is disengaged, command means operable when both engines are operating and said fiirst clutch is engaged to engage said synchronizing clutch and thereby couple said output shaft to said gas turbine engine to synchronize the speeds of the two, a speed sensor producing a first signal upon attainment of substantial synchronization, means responsive to said first signal to attempt engagement of said second clutch, a first proximity sensor responsive to movement of said movable clutch element into said engaged position to produce a second signal indicating engagement of said second clutch, means responsive to failure of said movable element to move into said engaged position to produce a third signal indicating a missed engagement and the need for a reengagement cycle, and means responsive to said third signal to initiate a reengagement cycle including movement of said movable element to said disengaged position, slipping and reengagement of said synchronizing clutch to change the angular relation of said elements, and attempted reengagement of said second clutch.

2. The combination defined in claim 1 in which said means producing said third signal include a timer activated at the beginning of attempted engagement and operable to produce the third signal in the absence of a second signal during a timed interval of preselected length, and means for disabling said timer when said second signal is produced within said interval.

3. The combination defined in claim 1 in which said last-mentioned means include means responsive to said third signal to retract said movable element to said disengaged position, a second proximity sensor signaling completion of such retraction, and means momentarily disengaging said synchronizing clutch for said slipping and then initiating reengagement of said second clutch.

4. In combination with first and second drive members, a rotary output member drivable by either of said drive members, first and second clutches for coupling said drive members respectively to said output member, said second clutch being a positive-locking toothed clutch having first and second clutch elements one of which is movable between engaged and disengaged positions and capable of being blocked against movement into said engaged position in one angular relation of said elements, a synchronizing friction clutch for coupling said second drive member to said output member independently of said second clutch when the output member and the second drive member are turning at different speeds thereby to synchronize the two for engagement of said second clutch, first, second and third operators for engaging and disengaging said first, second and synchronizing clutches, respectively, and selectively operable means for actuating said first operator to activate and deactivate said first drive member, the improvement comprising a shift control for activating said second drive member while said first drive member is activated, said control including, command means operable when actuated to initiate activation of said second drive member by actuating said third operator to engage said synchronizing clutch thereby coupling said output member frictionally to said second drive member, means operating when said output member and said second drive member are turning at the same speed to actuate said second operator in a direction to engage said second clutch, means sensing the position of said movable clutch element and producing a first signal when the movable clutch element fails to move into said engaged position, and means responsive to such signaling and operable to actuate said second operator in a direction to disengage said second clutch, slip said synchronizing clutch momentarily to change the angular relation of said elements, and then again actuate said second operator in a direction to engage said second clutch, said sensing means producing a second signal upon movement of said movable clutch element into said engaged position preparatory to disengagement of said first and synchronizing clutches.

5. The combination defined in claim 4 in which said sensing means includes a timer actuated upor initiation of engagement of said second clutch and operable to produce said first signal after a preselected timed interval, a proximity sensor producing said second signal upon movement of said movable clutch element into said engaged position, and means operable in response to production of said second signal during said timed interval to disable said timer.

6. The combination defined in claim 5 in which said responsive means include a second sensor producing a third signal as said movable clutch element returns to said disengaged position, said third signal actuating said third operator to slip said synchronizing clutch and said second operator to engage said second clutch.

7. The combination defined in claim 6 further including second command means operable when said second clutch is engaged to initiate activation of said first clutch, said second command means actuating said third operator to engage said synchronizing clutch, actuating said second operator in a direction to disengage said second clutch, and disabling said responsive means to prevent automatic actuation of said second operator in a direction to reengage said second clutch in response to said third signal.

8. The combination defined in claim 4 in which said operating means includes a speed sensor initiating actuation of said second operator when said second drive member is turning at a preselected speed and thereby indicating substantial synchronization of the speeds of said second drive member and said output member.

9. In combination with first and second drive members, an output member drivable by either drive member, first and second clutches for coupling said drive members respectively to said output member, said second clutch having opposed teeth movable into positive interlocking engagement between said second drive member and said output member, a synchronizing clutch for coupling said second drive member yieldably to said output member independently of said second clutch when the two are turning at different speeds and bringing the two into synchronization, and first, second and third operators for engaging and disengaging said first, second and synchronizing clutches, respectively, the improvement comprising a control for engaging said second clutch when said first operator is actuated and said first clutch is engaged, and said first drive member is driving said output member, ands aid second drive member is operating at a speed different from the speed of said output member, said control having, in combination, means for actuating said third operator to engage said synchronizing clutch and thereby initiating synchronization of said output member and said second drive member, means sensing attainment of such synchronization and actuating said second operator in a direction to engage said second clutch, means sensing and alternately signaling when said second clutch is disengaged and fully engaged, means responsive to the absence of a signal that said second clutch is fully engaged within a predetermined time interval after actuation of said second operator in a direction to engage the second clutch hand operable to control said operators to fully disengage the second clutch, disengage and then reengage said synchronizing clutch to change the relative position of said teeth, and then initiate engagement of said second clutch, and means responsive to a signal that said second clutch is fully engaged to deactuate said first operator for driving of said output element through said second clutch alone.

10. In combination with first and second drive members, an output member drivable by either drive member, first and second clutches for coupling said drive members respectively to said output member, said second clutch having opposed teeth movable into positive interlocking engagement between said second drive member and said output member, a synchronizing clutch for coupling said second drive member yieldably to said output member independently of said second clutch when the two are turning at different speeds and bringing the two into synchronization, and first, second and third operators for engaging and disengaging said first, second and synchronizing clutches, respectively, the improvement comprising a control for engaging said second clutch when said first clutch is engaged, and said first drive member is driving said output member, and said second drive member is operating at a speed different from the speed of said output member, said control having, in combination, first means for actuating said third operator to engage said synchronizing clutch and thereby initiate synchronization of said output member and said second drive member, second means sensing attainment of such synchronization and actuating said second operator in a direction to engage said second clutch, third means for sensing and signaling failure of said second clutch to engage as a result of interference between said teeth after actuation of said second operator, fourth means responsive to a failure signal from said third means for deactuating said second and third operators and thereafter automatically effecting an other operation of said first means, and fifth means sensing and signaling successful engagement of said second clutch preparatory to driving of said output member by said second drive member alone.

11. In combination with first and second drive members, an output member drivable by either drive member, first and second clutches for coupling said drive members respectively to said output member, said second clutch having opposed teeth movable into positive interlocking engagement between said second drive member and said output member, a synchronizing clutch for coupling said second drive member yieldably to said output member independently of said second clutch when the two are turning at different speeds and bringing the two into synchronization, and first, second and third operators for engaging and disengaging said first, second and synchronizing clutches, respectively, the improvement comprising a control for engaging said second clutch when said first clutch is engaged, and said first drive member is driving said output member, and said second drive member is operating at a speed different from the speed of said output member, said control having, in combination, means for actuating said third operator to engage said synchronizing clutch and thereby initiate synchronization of said output member and said second drive member, means sensing attainment of such synchronization and actuating said second operator in a direction to engage said second clutch, means for sensing and signaling failure of said second clutch to engage as a result of interference between said teeth after actuation of said second operator, means responsive to such signaling and operable to actuate said second operator in a direction to disengage said second clutch, actuate said third operator first to disengage said synchronizing clutch and then to reengage the same after momentary slippage between said output member and said second drive member, and then to again actuate said second operator in a direction to engage said second clutch whereby said control senses each missed engagement of said second clutch and initiates a reengagement cycle including slippage of said synchronizing clutch, and means sensing and signaling successful engagement of said second clutch preparatory to driving of said output member by said second drive member alone.

12. The combination defined in claim 11 in which said means for sensing and signaling failure of said second clutch to engage includes a timer actuated with said second operator and operable to signal failure to engage after a preselected time interval, said means for sensing and signaling successful engagement disabling said timer when engagement is accomplished within said interval.

13. The combination defined in claim 11 in which said second clutch includes a toothed element movable between a disengaged position and an engaged position by said second actuator, and said means sensing successful engagement is a sensor actuated by said toothed element to produce a first signal as the toothed element is moved into said engaged position.

14. The combination defined in claim 13 further including a second sensor actuated by said toothed element to produce a second signal as the element is moved into said disengaged position after a missed engagement, said second signal actuating said second operator to shift said element back toward said engaged position.

References Cited

UNITED STATES PATENTS

| 2,676,496 | 4/1954 | Gilbert | 74—661 |
| 3,064,775 | 11/1962 | Watts et al. | 192—.098 |
| 3,388,684 | 6/1968 | Gros et al. | 74—661 XR |
| 3,388,748 | 6/1968 | Jung | 74—661 XR |

CARLTON R. CROYLE, Primary Examiner

A. D. HERRMANN, Assistant Examiner

U.S. Cl. X.R.

60—11, 97; 74—339, 661; 192—48, 53, 87